United States Patent [19]
Esakov et al.

[11] 3,930,917
[45] Jan. 6, 1976

[54] LOW DENSITY LAMINATED FOAM AND PROCESS AND APPARATUS FOR PRODUCING SAME

[75] Inventors: Michael D. Esakov, Greer; Arvid Honkanen, Spartanburg, both of S.C.

[73] Assignee: W. R. Grace & Co., Duncan, S.C.

[22] Filed: Sept. 23, 1974

[21] Appl. No.: 508,316

[52] U.S. Cl. .............. 156/78; 156/306; 156/322; 156/324; 156/380; 264/45.6; 264/321; 428/313; 428/314
[51] Int. Cl.² .......................................... B32B 3/26
[58] Field of Search ...... 161/159, 160, 161; 156/77, 156/78, 322, 324, 306, 380, 497, 499, 555; 264/45.6, 321; 428/313, 314, 315

[56] References Cited
UNITED STATES PATENTS

| | | |
|---|---|---|
| 3,062,698 | 11/1962 | Aykanian............................ 156/306 |
| 3,180,778 | 4/1965 | Rinderspacher et al............ 156/322 |
| 3,398,035 | 8/1968 | Cleereman et al.................. 161/160 |
| 3,496,058 | 2/1970 | Schroter et al. .................... 161/160 |
| 3,499,819 | 3/1970 | Lewis.................................. 161/161 |
| 3,586,574 | 6/1971 | Soda et al. ......................... 156/380 |
| 3,814,659 | 6/1974 | Nadeau.............................. 428/314 |
| 3,823,047 | 7/1974 | Colombo ............................ 161/159 |

Primary Examiner—William J. Van Balen
Attorney, Agent, or Firm—John J. Toney; William D. Lee, Jr.; Richard G. Jackson

[57] ABSTRACT

An apparatus and process for laminating a flexible sheet of covering material to a foamed thermoplastic sheet wherein the process includes the steps of expanding aged or directly extruded thermoplastic foam sheet by heat until the foam has reached its softening point; heating the covering material to above the melting point of the foam; and, applying the heated covering material to the softened foam sheet to bond the sheet to the foam thereby forming a laminated product.

4 Claims, 1 Drawing Figure 3,930,917

LOW DENSITY LAMINATED FOAM AND PROCESS AND APPARATUS FOR PRODUCING SAME

FIELD OF THE INVENTION

This invention relates generally to a method and an apparatus for laminating sheet covering material to a foamed plastic substrate and, more particularly, relates to a process and apparatus for combining heated kraft paper sheet with a softened plastic foam substrate in a continuous manner.

BACKGROUND OF THE INVENTION

In the prior art the utility of a laminated sheet constructed of a foamed thermoplastic core sandwiched between two sheets of covering material has long been recognized. For example, in U.S. Pat. No. 2,770,406 issued to Gardiner Lane on Nov. 13, 1956, a carton is disclosed which is made from a laminate with a polystyrene foam core sandwiched between two sheets of kraft paper. Such a laminate is adaptable for replacing corrugated paperboard or wood in many carton and crate applications and is particularly useful where insulation is required for frozen items such as ice cream and frozen meat and vegtables or as a shipping carton for chilled food and produce. In such prior art applications the density of the polystyrene foam may vary between about two to about 10 pounds per cubic foot with a commonly preferred prior art density of about 3 pounds per cubic foot. If the density approaches ten pounds per cubic foot an unnecessary expense for the plastic material will be involved; but, on the other hand, if the expansion of the foam is carried too far the gas bubbles formed therein can easily become much too large resulting in a foam product which when cooled will tend to be too brittle and would crack when any pressure is applied thereto. Thus, according to the disclosure in the aforementioned Lane patent, it has been found that a material having a density in the neighborhood of 3 pounds per cubic foot appeared to be the most suitable for lamination between sheets of kraft paper. Furthermore, the Lane patent suggests as one particularly convenient method of forming such a laminate the placing of a sheet of polystyrene foam containing a foaming agent between two of the kraft paper sheets so that if the heating and foaming take place in the polystyrene under some pressure against the heated kraft sheets, the sandwiched parts may be made to adhere together without interposing any adhesive material.

Another prior art method of forming such a laminate is found in U.S. Pat. No. 3,062,698 which issued on Nov. 6, 1966 to A. A. Aykanian. In the Aykanian patent a method is disclosed for continuously making a laminate of polystyrene foam and kraft paper wherein the only heat applied to the previously formed polystyrene foam is through the kraft paper so that the foam is not heated or softened prior to its contact with the paper and the transfer of heat is through the paper to the foam.

In still another prior art process which is described in U.S. Pat. No. 3,823,047 which issued on July 9, 1974 to Roberto Colombo, all of the bonding heat is accumulated in the kraft paper sheet which is heated to a temperature exceeding the melting point of the resin prior to its contact with the styrene foam which is at ambient temperature.

It is a primary object of the present invention to provide a process for manufacturing a thermoplastic foam laminate which is an improvement over the prior art processes described above.

It is another object of the present invention to provide a process in which foam of lower density than that used in the prior art can be employed.

It is another object of the present invention to provide a process for making a laminated foam article whereby the probability of cracking the cells in the foam laminate is lessened.

Still another object of the present invention is to make a laminated article having a foamed core sandwiched between covering sheets which exhibits superior adhesion of the covering sheets to the foamed core and is flatter and more uniform in thickness than prior art laminates.

All the foregoing and other objects and advantages of the present invention will be apparent to those killed in the art from the following Summary of Invention and the Detailed Description of the Invention which follow.

SUMMARY OF THE INVENTION

In one aspect, the present invention is a process for laminating a flexible sheet of covering material to a foamed thermoplastic sheet comprising the steps of: expanding thermoplastic foam by heat until the foam is above its softening point; heating the sheet covering material to above the melting point of the foam; and, applying the heated covering material to the heated foam sheet to bond the sheet to the foam thereby forming a laminated article. The process can include the step of expanding the foam sheet in a steam atmosphere followed by the step of further expanding the foam by heat until the foam is above its softening point. In addition, the foam sheet may be aged and expanded in a steam atmosphere if maximum expansion is desired or it may be fed directly from an extruder and then expanded to above its softening point before lamination.

In another aspect, the present invention is an apparatus for laminating covering material to thermoplastic foam material comprising means for expanding thermoplastic foam in a steam atmosphere; means for further heating and expanding a foam sheet until it is above its softening point; means for heating the covering material to above the melting point of the foam; and, means for applying the heated covering material to the foam sheet to bond the sheet to the foam.

DESCRIPTION OF THE DRAWINGS

The present invention may be more readily understood by reference to the drawing which is made a part of this disclosure and in which.

DETAILED DESCRIPTION

Figure 1:
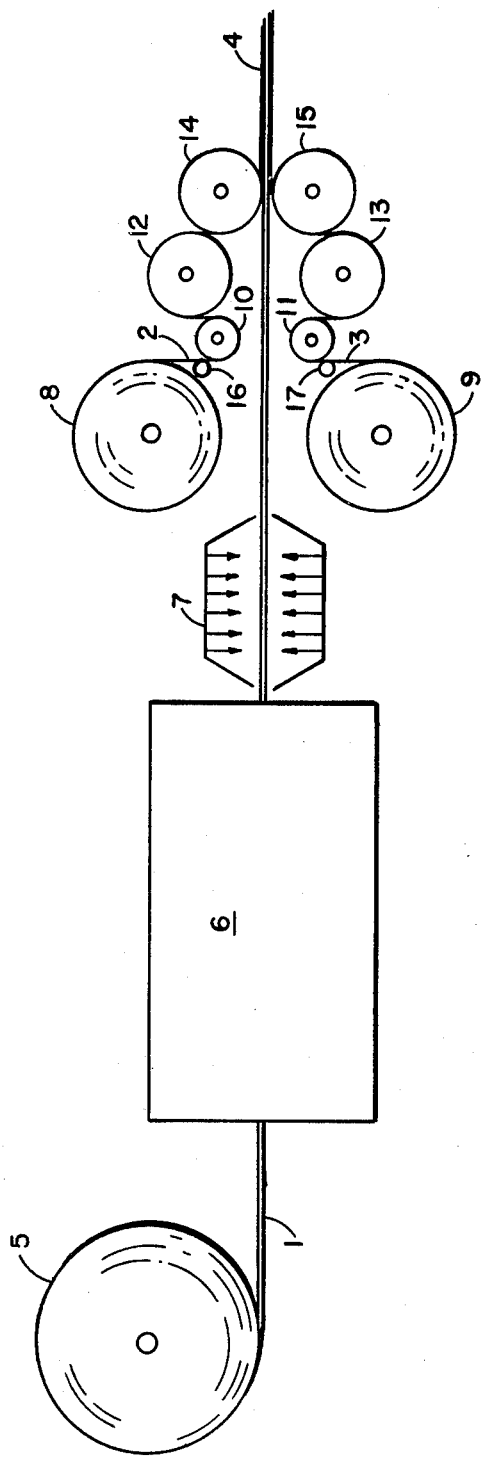
FIG. 1 is a schematic representation of the apparatus of the present invention.

The process and apparatus of the present invention will be first described with reference to FIG. 1 which is a schematic representation of a side elevation view of the apparatus of the present invention. The operation of the apparatus will be described with temperatures and conditions pertinent to polystyrene foam and kraft paper. However, it is to be understood that the process and apparatus of the present invention are not limited to these materials as foamed thermoplastic materials in general may be used, and flexible materials such as paper, textile, aluminum or metal foil, or plastic may be employed as the covering material.

The preferred polystyrene foam which is used in the present invention may be aged at least 24 hours subsequent to the time it is extruded in the form of expanded sheet. The reason for the aging is because, as a result of cooling after extrusion, the gas pressure in the foam cells is reduced to below atmospheric pressure so that a subsequent immediate heating of the foam will produce little or no increase in the thickness of the sheet or web. In other words, the heating of the extruded sheet immediately after it is cooled will not result in a significant lowering of the density of the foam. However, if the foamed sheet is stored for at least 24 hours at atmospheric pressure, the atmospheric air will diffuse into the foamed cells to an extent to establish in the cells atmospheric pressure with the result that the subsequent heating of the web will produce a substantial increase in thickness of the web due to the heat expansion of the air which has diffused into the foam cells.

Referring now to FIG. 1, a substrate or web 1 of foam sheet is shown being unwound from roll 5 and being fed into steam chambers 6 which preferably is saturated steam at atmospheric pressure maintained at a temperature of 180° to 212°F. Super heated steam or elevated pressure within steam chamber 6 would increase the expansion rate. However, at atmospheric pressure a dwell time of one to three minutes in the steam chamber generally expands the foam sufficiently without incurring any rupture of foam cells. In other words, it has been found quite satisfactory to use the steam chamber at atmospheric pressure as the means for expanding the thermoplastic foam.

After the expanded foam leaves steam chamber 6 it moves into oven 7 which is the means for further expanding the foam. Oven 7 may either employ radiant heating means such as infra red lamps or it may employ convection means such as Calrod units with blowers or fans. Normally, the interior temperature of the oven will be sufficient to heat the foam so that as the foam passes therethrough it will reach its softening point in the range of 180° to 230°F. Also, any trapped or residual moisture in the foam after it passes through the steam chamber will be driven off in the oven 7. However, the heating within the oven 7 must be carefully regulated so that the foam cells do not expand too greatly and rupture.

To the right of the oven 7 in FIG. 1 are upper and lower paper rolls 8 and 9. These rolls will generally carry kraft paper of the same width as the web 1 for lamination thereto. However, it is to be understood that rolls 8 and 9 and the covering material 2 and 3 which is fed respectively therefrom is not limited to being paper or even of the same material. For example, covering material 2 could be a sheet plastic material such as polyethylene or polystyrene and the sheet covering material 3 could be a textile material such as a light weight canvas cloth. Furthermore, both sides of the foam web 1 do not have to have a laminate applied thereto and either covering material 2 or 3 can be eliminated.

As the covering material 2 and 3 is pulled from the rolls 8 and 9 the respective surfaces which will be adjacent to the foam web 1 pass over idler rolls 16 and 17. Next, the covering material 2 and 3 passes over guide rolls 10 and 11 and then over heating rolls 12 and 13. The heating rolls are maintained at a temperature in the 350° to 550°F range by either passing a heating fluid such as oil which does not boil in the 550° to 700°F temperature range through the rolls, or super heated steam may be used. When leaving the heating rolls 12 and 13, the paper or covering material 2 and 3 will have a temperature in the range of 350°F to 450°F which is above the melting point of the foam web 1.

After leaving the heated rolls 12 and 13, the covering material 2 and 3 is fed between nip rolls 14 and 15. The nip rolls are heated to prevent any loss in temperature or heat in the covering material and the temperature of the nip rolls will be in the range of 230°F to 330°F. The softened foam web 1 also passes through nip rolls 14 and 15 with the covering material on either side of it. The nip rolls are adjusted so that only light pressure is applied as the covering material is rolled onto the softened foam. If too much pressure is applied then the foam cells will be deformed or even crushed and the density of the foam sheet will be increased. The only pressure that is necessary to be applied by the nip rolls is that pressure necessary to maintain good contact of the covering materials 2 and 3 with the foam web 1. Since the covering material or kraft paper in this instance is heated to the range of 350° to 450°F which is above the melting point of the polystyrene foam and since the foam web 1 has already been heated to a temperature in the range of 180° to 230°F, the contact of the heated paper and foam results in almost immediate melting of the surface of the foam and as the foam and paper laminate is now in ambient atmosphere the melting is followed by rapid cooling to below the melting point with the resultant adhesion of the paper to the foam.

Since the foam is softened when it passes through the nip rolls the possibility of cracking or rupturing the foam cells is greatly reduced and the surface melts more rapidly upon contact with the heated paper thus promoting excellent adhesion on all parts of the surface of the foamed sheet. In addition, since the foam is softened when passing through the rolls it will tend to be flatter and more uniform in thickness than if the foam is not softened. In other words, laminating the foam while it is softened by passing it through the nip rolls results in a more level and planar product with less warpage than in laminates made by prior art processes.

In a typical process, the polystyrene foam sheet as it leaves the extruder and is cooled will have a density of approximately three pounds per cubic feet. After aging for at least 24 hours and then passing through the steam expansion chamber as described above, the foam will have its density lowered to the range of one to two pounds per cubic feet and will increase from a thickness of approximately ⅛ inch to approximately ¼ inch. The width of the sheet can be any standard width such 24, 36, 48 inches, or wider.

Paper in a typical application would be in the range of 90 to 160 pounds per ream for paper on a 36 inch diameter roll. One application of the foam and paper laminate would be as roof and side sheeting for mobile homes or other structures where light weight, strength, and good insulating properties with mimimum thickness are desired. Also, the material may be used as a substitute for corrugated paperboard in applications where light weight and good insulating properties are desired as the foam plastic is an excellent heat insulator.

As used herein, the term "softening point" is the temperature at which there is an abrupt drop in the modulus of elasticity as the material is heated from its hard and stiff state; and, for most polymers, this point can be said to approximate the glass transition temperature or be somewhat less than the glass transition temperature. For polystyrene, the modulus of elasticity begins dropping sharply at about 82°C (180°F) while the glass transition temperature is given as 100°C (212°F).

The "softening range" is the temperature range which begins with the "softening point" and ends with the beginning of a low modulus region where the material begins to behave like rubber or, for some polymers, the range ends where the molecules exhibit free flowing characteristics. For polystyrene the range ends at about 230°F (110°C) so that the softening range of polystyrene is from 180°F to 230°F.

In addition, multiple layer laminates may be produced by use of the present process. For instance, as described above, the laminate 4 emerges from laminating rolls 14 and 15 in FIG. 1 with first and second covering materials 2 and 3 applied to both sides thereof. However, by using the same process and applying a third covering material to only one side of a second foam sheet and then feeding such a laminate with the second foam sheet still in a softened condition through nip rolls 14 and 15 with the third covering material adjacent to first foam sheet 1, a laminate will be produced having the following construction: first covering material/first foam sheet/third covering material/second foam sheet/second covering material.

In some insulating application it is desirable to laminate an aluminum or metal foil to the foam so that the foil is used as a heat reflective layer. Foil may be laminated directly to the foam sheet 1 without adhesives and may be substituted for either covering material 2 or 3 to make a laminate having the following constructions: metal foil/thermoplastic foam; or, metal foil/thermoplastic foam/covering material.

Having thus described our invention, we claim:

1. A process for laminating covering material selected from the group consisting of paper and metal foil to foamed polystyrene sheet comprising the steps of:
   a. aging the thermoplastic foam sheet after it has been extruded;
   b. expanding the foam sheet in a steam atmosphere at a temperature in the range of 180°F to 212°F;
   c. further expanding said foam sheet by heating it outside of said steam atmosphere until the foam reaches the temperature in the range of 180° to 230°F;
   d. heating said covering material until it is above the melting point of the foam; and,
   e. applying said heated covering material to the heated and softened foam sheet to bond said sheet to said foam thereby forming polystyrene foam laminate.

2. The process of claim 1 wherein the further expanding of said foam is accomplished by passing the foam sheet through a radiant heat oven and the heating of said covering material is accomplished by passing the paper over rollers maintained in the temperature range of 350° to 550°F.

3. The process of claim 1 wherein said covering material is paper including the steps of providing and applying a second paper sheet to the opposed side of said softened foam sheet after said second sheet has been heated above the melting point of the foam.

4. The process of claim 3 including the steps of providing and applying a second heat softened foam sheet to said second paper sheet and then applying a third paper sheet heated above the melting point of the foam to said second foam sheet.

* * * * *